Oct. 16, 1956   M. S. ROSENBERGER   2,766,639
TRANSMISSION CONTROL SYSTEM
Filed Nov. 8, 1952   2 Sheets-Sheet 1

INVENTOR
Maurice S. Rosenberger
BY
Willits, Helmig & Baillio
ATTORNEYS

United States Patent Office 2,766,639
Patented Oct. 16, 1956

2,766,639

TRANSMISSION CONTROL SYSTEM

Maurice S. Rosenberger, Birmingham, Mich., assignor to General Motors Corporation, Detroit, Mich., a corporation of Delaware Application November 8, 1952, Serial No. 319,499

38 Claims. (Cl. 74—472)

This invention relates to a control system for a transmission having a combination torque converter and step-ratio gearing wherein the control system is arranged to provide for automatic shift of the gear ratio in the gearing unit in which the timing of shift of drive ratio is determined as a function of vehicle speed and engine torque demand.

The invention pertains to a combination torque converter and step-ratio gearing control system having a hydraulically controlled shift valve for determining drive ratio in the step-ratio gearing unit, and incorporating a novel form of manually operable overcontrol valve effective at driver will to override the hydraulically controlled shift valve for providing a forced downshift in the step ratio gearing unit.

An additional feature is the provision of valve means controlled by engine vacuum and a vehicle speed responsive governor for controlling the pressure value of the fluid pressure utilized to actuate fluid pressure responsive servo members of the step-ratio transmission to establish different drive ratios.

A further feature is the provision of a hydraulically controlled valve associated with a manually controlled drive range selector valve effective in at least one position of the manual valve to admit governor delivered pressure to a line pressure regulator valve and effective in a second position of the manually controlled valve to block off the line pressure control valve from the pressure delivered by the governor.

An additional feature is the provision of a valve controlled by a manually operable drive range selector valve in combination with a vacuum controlled pressure regulator valve effective in at least one drive range position of the drive range selector valve to direct a variable pressure supplied by a vehicle speed responsive governor to the pressure regulator valve to decrease the line pressure maintained by the pressure regulator valve to a value less than the pressure value normally maintained by the pressure regulator valve when the drive range selector valve is placed to select a different drive range of operation.

Another feature of this invention is the provision of control means for controlling the pressure value of fluid pressure supplied to fluid pressure responsive servo members for determining transmission drive ratio, effective to decrease the line pressure as a function of increasing engine vacuum and also to decrease the line pressure as a function of increase in vehicle speed.

A further object of this invention is to provide in a transmission control system having fluid pressure actuated servo members for determining drive ratio, a pressure regulator valve for regulating the line pressure supplied to the servos controlled as a function of engine torque demand and also as a function of vehicle speed to insure positive shifts with maximum smoothness at all vehicle speeds.

An additional object of this invention is to provide in a control system of the class described, a valve effective to control the rate of fluid pressure exhaust from a fluid pressure actuated servo to determine the rate of application of the servo for providing smooth servo engagement.

A more particular object of this invention is to provide in a transmission control system having a pair of fluid pressure actuated servo members, a passage connecting the servos in series having a timing valve therein adapted to control the rate of fluid pressure discharge from one servo to the other servo in a plurality of stages, as determined by the pressure level of fluid pressure being discharged.

A still more particular object is to provide in a transmission having a clutch adapted to be actuated by fluid pressure and having a band adapted to be released by application of fluid pressure, a passage connecting said band and clutch having a valve therein adapted to permit unrestricted fluid discharge from the band servo to the clutch servo whenever the pressure in the band servo exceeds a predetermined pressure value, and arranged to provide for restricted fluid pressure discharge from the band servo to the clutch servo whenever the fluid pressure in the band servo falls below the predetermined pressure value during the shift interval at which shift from direct to reduction drive is accomplished.

Another object of this invention is to provide in a control system having a shift valve for controlling the admission of pressure to and exhaust of pressure from a fluid pressure controlled servo member, an exhaust passage controlled by the shift valve and a vehicle speed responsive governor controlled valve for varying the rate of exhaust of fluid pressure through the exhaust passage.

An additional object of this invention is to provide in a control system having a fluid pressure responsive servo member controlled by a shift valve, an exhaust passage from the shift valve having a line pressure controlled valve effective to vary the rate of fluid pressure exhaust through the exhaust passage.

A further object of this invention is to provide in a transmission control system having a fluid pressure responsive servo member and having a shift valve adapted to admit fluid pressure to and exhaust fluid pressure from the servo, an exhaust passage controlled by the shift valve, a governor controlled valve for varying the rate of fluid pressure discharge from said passage, and an additional valve controlled by line pressure for varying the rate of discharge of fluid pressure from said exhaust passage.

These, and other objects, features, and advantages of this invention will be apparent from the following specification and claims taken in conjunction with the accompanying drawings, in which:

A transmission with which the control system of the present invention may be employed is fully described in the co-pending application of Oliver K. Kelley and Robert S. Plexico Serial Number 291,692, filed June 4, 1952. Accordingly, all of the details of the transmission are not disclosed in the present application. In general, the transmission consists of a hydraulic torque converter adapted to drive a vehicle load shaft through a two-speed planetary step-ratio gearing unit. The torque converter 5 includes an impeller 6, a turbine 7, and a reaction member 8. Turbine 7 is adapted to drive a shaft 9 which may be the power input shaft for a planetary gearing unit, not shown. The planetary gearing unit is adapted to provide for reduction drive when a band is applied to a drum to prevent rotation of a sun gear in the planetary gearing unit. Reverse drive may be obtained by applying a second band to a second drum to prevent rotation of the planetary gearing unit annulus gear. Direct drive through the planetary gearing unit may be established by engaging a clutch to lock up the planetary gearing unit.

Figure 1:
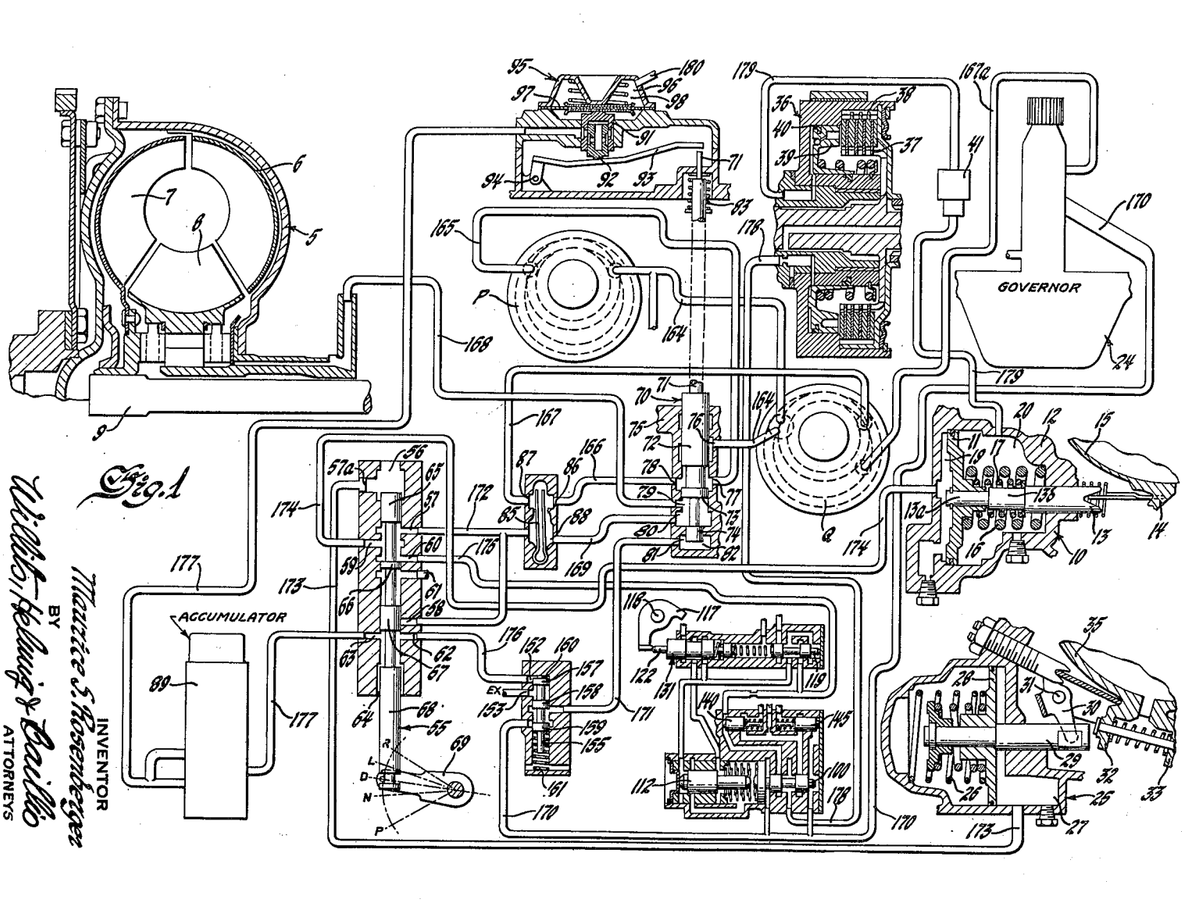
Figure 1 is a schematic diagram of the transmission control system illustrating the manually operable drive range selector valve in its drive range position of operation.

In Figure 1, there is shown schematically a control system for a low band actuator servo 10 to establish forward reduction drive, for selectively engaging a direct drive clutch servo 36, and for selectively engaging a reverse band servo 25. The low band actuator servo 10 includes a piston 11 in housing 12 adapted to move a band actuator stem 13 to force an ear 14 of band 15 to apply the band to a drum (not shown) to establish reduction drive.

A spring 16 yieldably biases servo piston 11 toward a band release position. Piston 11 divides housing 12 into two chambers 19 and 20 adapted to receive fluid pressure from passages 174 and 179 respectively. When fluid pressure is supplied to passage 174 and chamber 19, and chamber 20 is connected to exhaust, piston 11 applies band 15 to establish reduction drive. When fluid pressure is admitted to both chambers 19 and 20 simultaneously, the band is relesed.

Piston 11 is carried by a reduced portion 13a of stem 13, and is movable with respect to stem portion 13a and adapted to contact one end of a second stem portion 13b under influence of fluid pressure in chamber 19. A preloaded spring 17 is positioned between piston 11 and a large section of stem 13. In operation, the spring 17 acts as a mechanical accumulator to cushion the application of band 15 when shifting from neutral to drive range operation. With the transmission in neutral, the drum (not shown) with which band 15 is associated, is permitted to spin freely. When drive range is established upon shifting from neutral to drive, the band 15 is applied to a freely spinning drum driven by the engine. The preloaded spring 17 provides for smooth band engagement by permitting piston 11 to initially apply force to stem 13 through spring 17, and thereafter piston 11 contacts stem portion 13b to directly apply force to the stem 13.

The reverse band servo 25 of Figure 1 is spring biased by a spring 26 to its released position, and is applied through action of fluid pressure acting in a chamber 27, supplied to chamber 27 through a passage 173. Spring 26 biases a piston 28 and a stem 29 toward a band release position. Fluid pressure in chamber 27 moves piston 28 to apply a band 35 for reverse operation. When fluid pressure is admitted to chamber 27, piston 28 moves stem 29 to rock a lever 30 about a shaft 31, to force an ear 32 of band 35 toward ear 33 to apply the band. Ear 33 is prevented from moving, being anchored to the servo housing.

A clutch servo 36, for establishing direct drive in the transmission, includes clutch plates 37 and 38 which may be engaged by a piston 39 to establish direct drive. Fluid pressure to apply clutch piston 39 is supplied through a passage 178 to a chamber 40 at one side of piston 39.

It will be noted that when fluid pressure is admitted through passage 178 to the clutch piston 39 to establish direct drive, this pressure is also conducted through the piston chamber 40 to a passage 179 leading to chamber 20 of the low band actuator servo 10 to release the band. One of the features of this invention is the provision of a valve 41 in passage 179 adapted to permit rapid flow of fluid from the clutch servo to the band release chamber 20, and to provide for rapid exhaust of fluid from chamber 20 of servo 10 whenever the pressure in chamber 20 exceeds a predetermined pressure value, such as for example, 65 pounds per square inch, and to provide for restricted exhaust of pressure fluid from chamber 20 whenever the pressure value of fluid being exhausted from chamber 20 falls below said predetermined pressure value. The valve 41 functions to delay the time required to apply the low gear band and permits the direct drive clutch additional time to exhaust to provide for smoother shift from direct to reduction drive.

The timing valve 41 is positioned in the passage 179 connecting the direct drive clutch servo chamber 40 to chamber 20 of reduction drive servo 10. Due to the action of band release spring 16 of servo 10, fluid pressure in chamber 20 of servo 10 will release the servo even though fluid pressure in chamber 19 tends to apply the servo. The rate of application of band 15, therefore, depends upon the rate of fluid pressure discharge of fluid pressure from chamber 20 of servo 10. Chamber 20 of servo 10, and chamber 40 of clutch servo 36, are connected in series with a pair of timing valves 140 and 145 when a shift valve 100 is positioned in its reduction drive or downshift position. The valves 140 and 145, therefore, time the rate of discharge of pressure from both servos. It has been found to be advantageous to provide the additional valve 41 in the passage 179 between chamber 40 of servo 36, and chamber 20 of servo 10, to vary the rate of fluid pressure discharge from chamber 20 to chamber 40. This valve 41 is shown in detail in Figure 3.

Figures 2, 3:
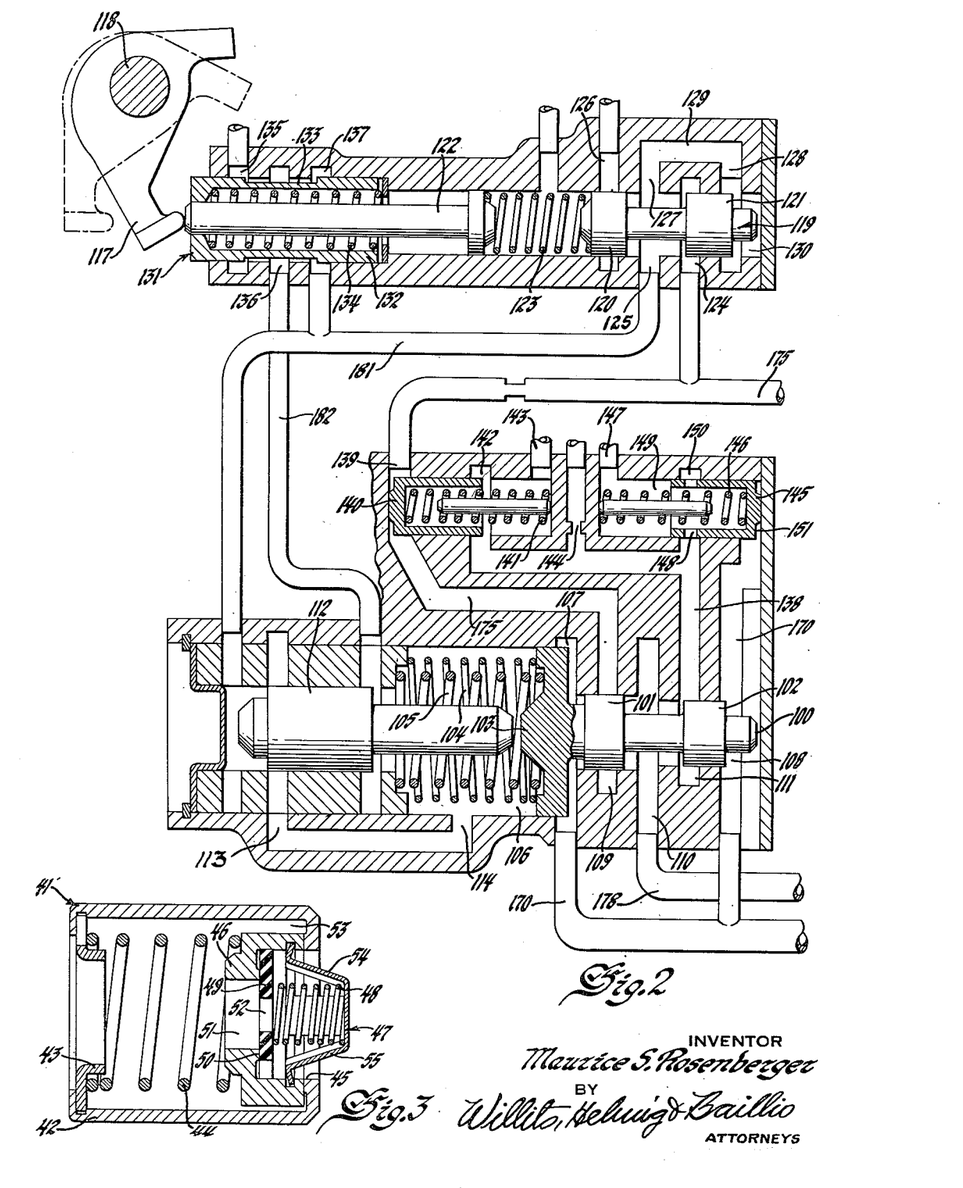
Figure 2 is an enlarged view illustrating the shift valve, throttle valve, forced downshift valve, and timing valve assembly for controlling the admission of fluid pressure to and exhaust of pressure from the transmission servo members.
Figure 3 is an enlarged view of the timing valve for controlling the rate of exhaust of fluid pressure from the band servo to the clutch servo.

Valve 41 is arranged to provide for unrestricted flow of fluid pressure from clutch servo chamber 40 to chamber 20 of servo 10, and to permit unrestricted fluid pressure from chamber 20 whenever the pressure in chamber 20 exceeds a predetermined pressure value, and to thereafter provide for restricted fluid pressure discharge from chamber 20 when the fluid pressure in chamber 20 falls to said predetermined pressure value. As shown in Figure 3, valve 41 is formed of a housing 42 shaped to hold a spring retainer 43 for relatively heavy spring 44, and is shaped to provide an annular valve seat 45. An opening is provided through spring retainer 43 to permit fluid flow therethrough. A valve 46 is spring biased by spring 44 into contact with valve seat 45. Valve member 46 is shaped to support a spring retainer 47 for a relatively light spring 48 adapted to bias a valve 49 into registry with a valve seat 50 formed on valve member 46. Valve member 46 and valve member 49 are provided with openings 51 and 52, respectively, to permit fluid flow through the valve members. Opening 51 is relatively large and provides no substantial restriction to fluid flow. Opening 52, on the other hand, is relatively small and presents a fluid flow restriction. A passage 53 is provided between valve member 46 and housing 42. Spring retainer 47 is formed with four fingers, two of which, 54 and 55, are shown in Figure 3 to permit fluid flow between the fingers.

In operation, fluid pressure being admitted through passage 179 of Figure 1 to chamber 20 of servo 10, to release servo 10 passing through valve 41, will force valve member 49 against light spring 48 to move the valve member away from seat 50. This permits unrestricted admission of fluid pressure to chamber 20 of servo 10 so that the servo will be released as clutch servo 36 is being applied. When fluid pressure is being discharged from chamber 20 of servo 10, the rate of discharge is varied in accordance with the pressure value of fluid pressure in chamber 20. If the pressure level of fluid pressure exceeds a predetermined amount, for example 95 pounds per square inch, fluid pressure being discharged from chamber 20 to chamber 40 will unseat valve member 46 from valve seat 45 to permit a rapid rate of discharge through passage 53. When the pressure value of fluid pressure in chamber 20 falls below a predetermined pressure value, heavy spring 44 will seat valve 46 so that fluid pressure discharge occurs solely through relatively small opening 52 in valve member 49. On a downshift from direct to reduction drive, therefore, the rate of application of band servo 10 occurs in two stages, an initial stage wherein the servo is quickly moved towards its band applying position, and a second stage wherein application of the band occurs smoothly and gradually.

Referring again to Figure 1, a manually operable drive range selector valve 55 is adapted to be positioned to select neutral, drive range, low range, and reverse conditions of transmission operation. With the manual valve 55 positioned to select drive range of operation, the transmission may be conditioned for reduction drive, or for direct drive, as determined by a fluid pressure controlled shift valve 100. With the manual valve 55 positioned to select either low or reverse, drive is always in reduction.

A line pressure regulator valve 70 is controlled by spring pressure, engine vacuum and a variable fluid pressure delivered by a governor responsive to vehicle speed for regulating the pressure value of fluid pressure supplied to the servos. In low and reverse settings of manual valve 55, the governor action is cut off from the line pressure regulator valve 70.

As shown in detail in Figure 2, shift valve 100, adapted to control the admission of fluid pressure to and exhaust of pressure from servos 10 and 36 of Figure 1, is provided with an exhaust passage 138 having a fixed fluid pressure discharge orifice or restriction 144, and a pair of variable discharge orifices 142 and 150 for controlling the rate of discharge of fluid pressure from the chamber 40 of servo 36. A valve 140 is spring biased by a spring 141 to connect orifice 142 to an exhaust port 143. Valve 140 is acted upon by line pressure delivered by pressure regulator valve 70 of Figure 1 to vary the effective discharge area of orifice 142. Variable orifice 150 is controlled by a valve 145 spring biased by a spring 146 to permit highly restricted fluid pressure discharge through orifice 150. Valve 145 is responsive to governor pressure delivered by a vehicle speed responsive governor 24 of Figure 1 to vary the rate of fluid pressure discharge through orifice 150 to permit more rapid discharge as vehicle speed increases.

The timing of shift of drive ratio is determined as a function of vehicle sped and engine throttle opening by means of shift valve 100, which in turn, is controlled by governor delivery pressure and by throttle valve pressure delivered by an accelerator pedal controlled valve 119. The accelerator pedal controlled valve 119, hereafter called a throttle valve, embodies novel structural detail in combination with an overcontrol or forced downshift valve 131. These details will be hereafter more particularly described and explained.

Referring further to Figure 1, there is shown an engine driven pump P adapted to deliver fluid pressure through a passage 165 to a port 77 of a line pressure regulator valve 70. Regulated line pressure is delivered from port 78 of pressure regulator valve 70 to a port 86 of a check valve 85 through a passage 166. A vehicle tail shaft driven pump Q delivers fluid under pressure to a port 87 of check valve 85 through a passage 167, and to a vehicle speed responsive governor 24 through a passage 167a. Check valve 85 is adapted to block off passage 167 from passage 166 to prevent discharge of pressure from pump P to pump Q when the vehicle is stopped. At high vehicle speeds, when pump Q has sufficient capacity to satisfy the fluid pressure requirements of the system, valve 85 blocks off passage 166 so that fluid pressure supplied by pump P is dumped back to the suction side of the pumps through port 76 of pressure regulator valve 70 and suction passage 164.

Line pressure regulator valve 70 is composed of a stem 71 having lands 72, 73 and 74 formed thereon. The valve housing 75 is provided with ports 76, 77, 78, 79, 80 and 81 therein. Port 76 exhausts to pump suction passage 164. Port 77 admits pressure from the discharge passage 165 of pump P. Port 78 admits regulated pressure to passage 166. Port 79 admits pressure to torque converter fluid pressure supply passage 168. Port 80 admits pressure from passage 169 connected to port 88 of check valve 85 to the space between lands 73 and 74. Port 81 admits governor pressure from a governor pressure delivery passage 171 to a chamber 82 beneath land 74. A spring 83 acts upon stem 71 to force the valve into housing 75 to position the valve to maintain a given line pressure. It will be noted that land 73 is of greater diameter than that of land 74. Fluid pressure from passage 169 tends to move the valve to connect port 77 to exhaust port 76. In addition, governor pressure in chamber 82 acting upon land 74 tends to move valve 70 to connect the fluid pressure supply port 77 to port 76. In the event that pump Q is supplying the fluid pressure past check valve 85 to port 80 of valve 70, this pressure, acting upon land 73 will tend to move the valve to connect port 77 to exhaust port 76.

At the left of check valve 85 of Figure 1, there is shown the manually operable drive range selector valve 55 adapted to select neutral, drive range, low, and reverse conditions of transmission operation. The valve is shown in its drive range position in Figure 1. Valve 55 is provided with ten ports 56, 57a, 57, 58, 59, 60, 61, 62, 63 and 64. Port 56 exhausts to sump. Port 57a connects to a pressure delivery passage 173 leading to a chamber 27 of a reverse band actuator servo 25. Ports 57 and 58 connect fluid pressure supply passage 172 to the valve bore. Port 59 connects to a passage 174 leading to the chamber 19 of a low band actuator servo 10. Pressure supplied through passage 174 to chamber 19 tends to actuate the servo to apply the band to establish low gear drive ratio. Port 60 connects to main line pressure delivery passage 175 leading to port 124 of throttle valve 119, to port 139 of variable orifice discharge valve 140, and to port 109 of shift valve 100 (see Figure 2). Port 61 exhausts to sump. Port 62 connects to passage 176 leading to port 152 and chamber 160 governor pressure cut-off valve 155. Port 63 connects to passage 177 leading to accumulator 89, and port 64 exhausts to sump. Valve 55 is composed of lands 65, 66, 67 and 68, and may be operated by a lever 69 controlled by the vehicle operator through any suitable linkage, not shown.

With drive range selector valve 55 positioned for neutral, passages 172 and 174 are connected to exhaust port 61 of valve 55. With all line pressure dumped to exhaust, none of the servos 10, 25 or 36 can be applied, and no torque can be transmitted. With valve 55 positioned to select drive range condition of operation, as shown in Figure 1, line pressure is directed through passage 174 to chamber 19 of low band actuator servo 10 to apply the low band. A second chamber 20 of low band servo 10 is connected to exhaust by way of passages 179 and 178, and ports 110 and 111 of shift valve 100, so that fluid pressure in chamber 19 is effective to actuate the servo to establish low or reduction drive. Line pressure is conducted through passage 175 to port 109 of shift valve 100. In the event that shift valve 100 is moved to its upshift, or direct drive position, pressure from passage 175 will be admitted through ports 109 and 110 to passage 178. This pressure will be effective to actuate servo 36 to apply the direct drive clutch and to release servo 10.

With valve 55 postiioned to select low range condition of operation, line pressure is admitted to passage 174, this pressure acting in chamber 19 to actuate servo 10 to establish reduction drive. Port 60 of line pressure supply passage 175 is connected to exhaust port 61. No upshift to direct drive can occur since no pressure would be available to apply direct drive clutch servo 36, even though shift valve 100 should be moved to its direct drive position.

With valve 55 positioned to establish reverse, passage 172 is connected to passage 173 leading to reverse band servo 25, by way of ports 57 and 57a. Fluid pressure in chamber 27 of reverse servo 25 is effective to actuate the servo to establish reverse drive. In both low and reverse positions of valve 55, line pressure is directed through ports 58 and 62 of valve 55 to a passage 176 leading to a chamber 160 of governor pressure cut-off valve 155. This pressure, acting upon land 157 of valve 155 moves valve 155 against spring 161 to connect passage 171 and chamber 82 of valve 70 to exhaust port 153 of valve 155. In low and reverse settings of valve 55, governor pressure does not affect the control of line pressure. Also, in low and reverse settings of valve 55, line pressure is directed to passage 177 through ports 58 and 63 of valve 55. This pressure in passage 177 passes through an accumulator 89 to a hydraulic modulator associated with pressure regulator valve 70. The hydraulic modulator is composed of a pair of pistons 91 and 92 adapted to receive fluid pressure therebetween by way of passage 177. A lever arm 93 acted upon by piston 92 is adapted to pivot about a pin 94 to contact the end of stem 71 of valve 70. When actuated by hydraulic pressure, the hydraulic modulator acts in assistance to spring 83, forcing the stem 71 into housing 75 to raise the line pressure above the pressure value normally maintained by the pressure regulator valve when the manual valve 55 is positioned for drive range condition of operation.

A vacuum pressure regulator modulator 95 is associated with pressure regulator valve 70. In the absence of vacuum in chamber 96 above diaphragm 97, spring 98 is effective to force piston 91 against piston 92 to exert force upon lever 93 and valve stem 71 to raise the line pressure to a value greater than that controlled by spring 83. However, vacuum in chamber 96 raises diaphragm 97 against spring 98 to relieve the load of spring 98 from lever 93 to decrease the pressure value of fluid pressure delivered by pressure regulator valve 70. Chamber 96 is connected to the vehicle engine intake manifold by a passage 180. With a closed engine throttle, the vacuum in chamber 96 will be relatively high, and the pressure supplied by valve 70 will be minimum. With an open engine throttle, vacuum in chamber 96 will be relatively low, and spring 98 will be effective to raise the pressure value of fluid pressure delivered by valve 70.

With the drive range selector valve positioned for drive range of operation, the pressure value of fluid pressure delivered by valve 70 is controlled by spring 83, by engine vacuum, which tends to decrease the pressure when the vacuum is high, and by governor pressure which tends to decrease the pressure as vehicle speed increases. Thus, at low vehicle speed, and open engine throttle conditions of operation, line pressure delivered by valve 70 is maximum. At high vehicle speed and a closed engine throttle, line pressure is minimum. Line pressure increases as the engine throttle is moved from a throttle closing to a throttle opening position and decreases as the vehicle speed increases.

At the center bottom portion of Figure 1, and in detail in Figure 2, there is shown an assembly of valves for controlling the admission of fluid pressure to and exhaust of pressure from chamber 40 of direct drive clutch servo 36 and chamber 20 of reduction drive servo 10.

Referring particularly to Figure 2, the shift valve 100 for controlling the admission of fluid pressure to passage 178 leading to chamber 40 of direct drive clutch 36 is composed of lands 101 and 102, and a piston 103. A pair of springs 104 and 105 in spring chamber 106 yieldably bias valve 100 to its reduction drive or downshift position illustrated. A chamber 107 adjacent piston 103, and a chamber 108 adjacent land 102, are connected to governor pressure delivery passage 170. A governor 24 adapted to deliver fluid pressure which increases with increase of vehicle speed delivers governor pressure to passage 170 and chambers 107 and 108, the governor pressure tending to upshift the valve 100 to its direct drive position wherein line pressure is admitted from passage 175 to passage 178 through ports 109 and 110 of valve 100. Spring chamber 106 is adapted, under normal operative conditions, to receive a modulated throttle valve pressure which is proportional to, but less than, full throttle valve pressure delivered by a throttle valve 119. In normal operation, a modulator plug 112 moves between a position wherein throttle valve pressure from a throttle valve delivery passage 181 is admitted to chamber 106 through ports 113 and 114, and a position wherein spring chamber 106 is connected to exhaust through a passage 182 and ports 136 and 135 of forced downshift valve 131. A variable fluid pressure, which increases as the vehicle engine throttle is moved from a throttle closing to a throttle opening position, is delivered to passage 181.

The accelerator pedal controlled throttle valve and forced downshift valve assembly is operated by means of a cam 117 fixed to a rotatable shaft 118, which is connected by means of any suitable linkage (not shown) to the vehicle accelerator pedal (not shown), such that cam 117 causes the throttle valve to deliver a variable pressure which increases as the accelerator pedal is moved from a throttle closing to a throttle opening position. Throttle valve 119 is composed of a pair of lands 120 and 121. A stem 122 is arranged to transfer force from cam 117 to land 120 of valve 119 through a spring 123. Ports 124, 125, 126, 127, 128 and a passage 129 are associated with valve 119. Port 124 admits line pressure from passage 175 to the valve bore. Port 125 is the throttle valve pressure delivery port whereby throttle valve pressure is delivered to passage 181. Port 126 exhausts to sump, and ports 127 and 128 admit throttle valve pressure to a chamber 130 at the end of land 121 through the passage 129. The pressure level of fluid pressure delivered by throttle valve 119 increases as the force of spring 123 acting upon land 120 increases. Cam 117 moves stem 122 against spring 123 as the accelerator pedal is moved from a throttle closing to a throttle opening position.

A forced downshift valve 131 controls the admission of fluid pressure to and exhaust of pressure from passage 182. Valve 131 is composed of a sleeve 132 through which stem 122 extends, and is provided with an annular recess 133. Port 135 exhausts to the transmission sump. Port 136 connects to passage 182, and port 137 connects to throttle valve delivery passage 181. A spring 134 yieldably biases sleeve 132 to connect port 136 to exhaust port 135, and to block off port 137. In operation, cam 117 is effective to initially force stem 122 through sleeve 132 to raise the throttle valve pressure delivered by valve 119 from a minimum to a maximum pressure, as the accelerator pedal is moved from a throttle closing to a throttle opening position. During this stage of operation, the pressure delivered to spring chamber 106 of valve 100 is a modulated throttle valve pressure, which increases in value as the throttle valve is moved to connect passage 175 to passage 181. After full open engine throttle is accomplished, further movement of the accelerator pedal forces cam 117 to contact sleeve 132 to move the sleeve to its forced downshift position shown in Figure 2. At forced downshift condition of operation, sleeve 132 is effective to block off exhaust port 135 and to admit full throttle valve pressure through ports 137 and 136, and passage 182 to spring chamber 106 of the shift valve. The forced downshift valve, stem and cam arrangement in conjunction with the throttle valve is structurally novel, compact, and simple to manufacture.

Further referring to Figure 2, there is shown the details of a pair of valves 140 and 145 for controlling the rate of fluid pressure discharge of fluid pressure from the direct drive clutch actuator servo 36 when shift valve 100 is positioned to select reduction drive. The rate of fluid pressure discharge is controlled as a function of line pressure under control of pressure regulator valve 140, and also as a function of vehicle speed under control of governor 24. As heretofore explained, when the drive range selector valve is positioned for normal drive range operation, line pressure is determined as a function of spring force 83, engine vacuum in chamber 98, and vehicle speed in chamber 82. Valve 140 is formed as a piston, spring biased by a spring 141 to connect port 142 of exhaust passage 138 leading from shift valve 100 to exhaust port 143 of valve 140. Line pressure from passage 175, acting upon the end of piston 140 biases valve 140, tending to move the piston against spring 141 toward a position wherein the piston blocks the exhaust of fluid pressure through exhaust port 143. At relatively low line pressure, exhaust through ports 143 and a fixed restriction 144 is permitted. As the line pressure is increased, valve 140 is moved to gradually reduce the effective discharge area, to increasingly restrict the rate of discharge through port 143, and upon the attainment of a predetermined line pressure, valve 140 will block off port 143 completely. The exhaust passage 138 is provided with a fixed restriction 144 for limiting the rate of fluid pressure discharge.

A second valve piston 145 is spring biased by a spring 146 to initially restrict the rate of fluid pressure discharge through an exhaust port 147, and to gradually reduce the restriction to permit a more rapid discharge of fluid pressure through exhaust port 147 as the vehicle speed increases. Valve piston 145 is provided with a series of openings 148 in the side wall thereof to admit exhaust fluid to the spring chamber 149, and hence to exhaust port 147. Port 150 is tapered so that the effective area of openings 148 in registry with port 150 is increased as the valve is moved against spring 146. Governor pressure from passage 170, acting in chamber 151, moves valve 145 against spring 146 to increase the effective area of port 150 as the vehicle speed increases. For example, at a vehicle speed of 15 miles per hour, the effective discharge area of port 150 may be .007 and at a vehicle speed of 30 miles per hour, this effective area may be increased to .040.

The timing valves 140 and 145 thus modify the ratee of discharge of fluid pressure from clutch serve 36 to decrease the rate of discharge as a function of increased line pressure, and to increase the rate of fluid pressure discharge from clutch servo 36 as a function of increasing vehicle speed. This prevents engine run-away during the shift interval, and at the same time, provides for smooth servo actuation without excessive shock.

by means of the provision of the timing valves 140, 145 and 41, the shock loading which normally occurs during downshift intervals is greatly minimized, and excess slipage of the grip means actuated by the servos is prevented. The governor pressure controlled valve 145 acts to restrict the rate of exhaust of pressure from the servo 36 at low vehicle speeds, such as for example, speeds below 15 miles per hour. However, at speeds above a predetermined speed range, such as from 15 to 30 miles per hour, valve 145 increases the rate of fluid pressure discharge by changing the effective area of the exhaust valve port. When both valve 140 and valve 145 are closed, clutch servo 36 exhausts through fixed restriction 144. Under high speed downshift conditions, the pressure level of fluid pressure in servo 36 is high due to centrifugal forces, and the change in speed in revolutions per minute of the engine resulting from change of drive ratio to downshift operation is great. The clutch, therefore, should be exhausted rapidly to prevent engine run-away with an open engine throttle. Governor controlled valve 145 accomplishes this purpose at high vehicle speeds.

At low vehicle speeds and low torque demand conditions of operation, as with a closed throttle, it is an advantage to have the clutch disengaged quickly by providing for rapid exhaust of the clutch servo. This is accomplished by line pressure controlled valve 140.

Under low vehicle speed downshifts, for example speeds up to 30 miles per hour at wide open throttle or forced downshift condition of operation, the torque demand is high, and the engine tends to speed up rapidly after disengagement of the clutch. The timing valves 140 and 145 delay clutch disengagement to prevent engine run-away, and the valve 41 conditions the band servo to apply the band smoothly without excess shock loading. These three valves, therefore, combine to prevent engine run-away, to permit initial rapid exhaust of chamber 20 of servo 10 to permit the servo to condition the band for application, and to thereafter more slowly exhaust chamber 19 of servo 10 to gradually and smoothly apply the band. The vacuum and governor pressure control of the line pressure regulator valve 70 assures that the line pressure supplied to the servos will be varied in accordance with torque demand and vehicle speed to provide sufficient pressure to permit slippage of the servo actuated grip means, and yet to prevent excess pressure from being supplied to the servos. This results in reducing the horsepower consumption for driving the pumps, and in greater vehicle gas mileage.

The throttle valve 119, forced downshift valve 131 combination in a single valve bore results in economy of use of material and manufacturing costs. The governor pressure cut-off valve 155 effective to exhaust the chamber 82 of pressure regulator valve 70, when the drive range selector valve is placed in low range of reverse, enables the hydraulic modulator 95 to control the line pressure in low and reverse settings of drive range selector valve 55.

The invention has been described with valve improvements in particular forms which are intended to be explanatory, and are not to be taken in any limiting sense, since various changes in the parts, construction and arrangement may be effected without departing from the full intent and scope of the invention as set forth in the appended claims.

I claim:

1. In a transmission control system having a pair of fluid pressure responsive servo motors adapted to establish different drive ratios, a fluid pressure source, valve means effective to direct fluid pressure to said servo motors to select the transmission drive ratio, and valve means responsive to fluid pressure discharge from one of said servos for controlling the rate of fluid pressure discharge from said servo, said valve being responsive to a predetermined pressure discharge from said servo to permit unrestricted fluid pressure discharge, said valve being effective upon a drop in the pressure value of fluid pressure discharged from said servo below said predetermined pressure to restrict the rate of discharge of pressure fluid from said servo.

2. In a transmission control system having a pair of fluid pressure controlled servo motors adapted to establish different drive ratios, a fluid pressure source, valve means for drecting pressure fluid from said source to said servos to select the transmission drive ratios, one of said servos having a chamber adapted to receive fluid pressure tending to actuate the servo to establish one drive ratio, the other of said servos having a chamber adapted to receive fluid pressure to release said other servo, a passage connecting said chambers, and valve means in said passage responsive to fluid pressure in said last-mentioned chamber for controlling the rate of fluid pressure discharge from said last-mentioned chamber to said first-mentioned chamber.

3. In a transmission control system having a pair of fluid pressure actuated servo members, a fluid pressure source, a chamber in one of said servos adapted to receive fluid pressure to apply said servo, a chamber in the other of said servos adapted to receive fluid pressure to release said other servo, a passage connecting said chambers, valve means effective to control the admission of pressure to and exhaust of pressure from said chambers, and a timing valve in said passage for controlling the rate of fluid pressure discharge from said second mentioned chamber to said first mentioned chamber.

4. In a transmission control system having fluid pressure responsive servo members for establishing different transmission drive ratios, a fluid pressure source, valve means including a shift valve for controlling the admission of fluid pressure to and exhaust of pressure from said servos, a fixed orifice for limiting the rate of fluid pressure discharge from said servos, and a variable fluid pressure controlled orifice for varying the rate of fluid pressure discharge from said servos.

5. In a transmission control system having fluid pressure responsive servo members for establishing different transmission drive ratios, a fluid pressure source, valve means including a shift valve for controlling the admission of fluid pressure to and exhaust of pressure from said servos, said shift valve having a fluid pressure discharge passage, a fixed orifice in said passage for limiting the rate of fluid pressure discharge from said servos, and a variable orifice in said passage controlled by fluid pressure for varying the rate of fluid pressure dicsharge from said servos through said shift valve.

6. In a transmission control system having a pair of fluid pressure actuated servos for establishing different drive ratios, a fluid pressure source, chambers in each of said servos adapted to receive fluid pressure, a passage connecting said chambers in seres, a timing valve in said passage for controlling the rate of fluid pressure discharge from one of said chambers to the other of said chambers, a shift valve adapted to control the admission of fluid pressure to and exhaust of fluid pressure from said chambers, and a restriction associated with said shift valve for controlling the rate of fluid pressure discharge from one of said servo members to exhaust.

7. In a transmission control system having a pair of fluid pressure actuated servos for establishing different transmission drive ratios, a fluid pressure source, chambers in each of said servos adapted to receive fluid pressure, a passage connecting said chambers in series, a timing valve in said passage for controlling the rate of fluid pressure discharge from one of said chambers to the other of said chambers, a shift valve adapted to control the admission of fluid pressure to and exhaust of fluid pressure from said chambers, and a fluid pressure responsive restrictor valve for varying the rate of fluid pressure discharge through said shift valve.

8. In a transmission control system for an engine driven vehicle, a fluid pressure actuated servo member, a fluid pressure source, a shift valve adapted to control the admission of pressure to and exhaust of pressure from said servo member, a pressure regulator valve for controlling the pressure value of fluid pressure supplied to said servo, means responsive to the torque demand on the vehicle engine for controlling said regulator valve to increase the pressure value as the torque demand increases, and valve means for controlling the rate of fluid pressure discharge from said servo through said shift valve, said valve means being controlled by the pressure value of fluid pressure supplied by said pressure regulator valve to vary the rate of fluid pressure discharge from said servo.

9. In a transmission control system, a fluid pressure controlled servo, a fluid pressure source, a shift valve for controlling the admission of fluid pressure to and exhaust of fluid pressure from said servo, a pressure regulator valve for controlling the pressure level of fluid pressure supplied to said servo, a governor adapted to deliver a variable fluid pressure, a first valve for controlling the rate of fluid pressure discharge from said servo, said valve being controlled by the pressure level of fluid pressure supplied by said pressure regulator valve, and a second valve for controlling the rate of discharge of fluid pressure from said servo, said second valve being controlled by fluid pressure delivered by said governor.

10. In a transmission control system for an engine driven vehicle, a fluid pressure actuated servo member, a fluid pressure source, means for selectively connecting said servo member to said fluid pressure source or to exhaust, a pressure regulator valve for controlling the pressure level of fluid pressure supplied to said servo through said connecting means, engine vacuum controlled means for varying the pressure level of fluid pressure supplied by said pressure regulator valve, and vehicle speed responsive means for varying the pressure level of fluid pressure supplied by said pressure regulator valve.

11. In a transmission control system for an engine driven vehicle, a fluid pressure actuated servo member, a fluid pressure source, means selectively connecting said servo member to said fluid pressure source or to exhaust, a pressure regulator valve for controlling the pressure level of fluid pressure supplied to said servo through said connecting means, engine vacuum responsive means associated with said pressure regulator valve for varying the pressure level of fluid pressure supplied by said pressure regulator valve, and a vehicle speed responsive governor adapted to deliver a variable fluid pressure, said governor being hydraulically connected to said pressure regulator valve to control said pressure regulator valve to vary the pressure delivered by said pressure regulator valve in accordance with changes in vehicle speed.

12. In a transmission control system for an engine driven vehicle, a fluid pressure actuated servo member, a fluid pressure source, valve means selectively connecting said servo member to said fluid pressure source or to exhaust, a pressure regulator valve for controlling the pressure level of fluid pressure supplied to said servo through said valve means, vacuum responsive means associated with said pressure regulator valve for varying the pressure level of fluid pressure delivered by said valve, means connecting said vacuum responsive means to the intake manifold of said engine, a vehicle speed responsive governor adapted to deliver a variable fluid pressure which increases with increase of vehicle speed, and a hydraulic connection between said governor and said poressure regulator valve, said governor delivered pressure being operative upon said pressure regulator valve to vary the pressure level of fluid pressure delivered by said pressure level valve in accordance with changes in vehicle speed.

13. In a transmission control system for an engine driven vehicle, a fluid pressure actuated servo, a fluid pressure source, valve means selectively connecting said servo to said fluid pressure source or to exhaust, a pressure regulator valve for controlling the pressure level of fluid pressure supplied to said servo through said valve means, vacuum responsive means operatively associated with said pressure regulator valve and connected to the engine intake manifold for varying the pressure level of fluid pressure delivered by said pressure regulator valve, said vacuum responsive means being operative upon said pressure regulator valve to increase the pressure level of fluid pressure delivered by said pressure regulator valve as engine manifold vacuum decreases, and a vehicle speed responsive governor adapted to deliver a variable fluid pressure which increases with increase of vehicle speed, said governor being hydraulically connected to said pressure regulator valve and effective to control said pressure regulator valve decrease the pressure level of fluid pressure delivered by said pressure regulator valve as the vehicle speed increases.

14. In a transmission control system for an engine driven vehicle, a fluid pressure actuated servo member, a fluid pressure source, means including a manually operable drive range selector valve and a fluid pressure controlled shift valve for controlling the admission of fluid pressure to said servo, a pressure regulator valve for controlling the pressure level of fluid pressure supplied to said servo, a governor adapted to deliver a variable fluid pressure, a passage for delivering governor pressure to said pressure regulator valve to vary the pressure level of fluid pressure delivered by said valve, and an additional valve controlled by said manually operable drive range selector valve for controlling the admission of governor pressure to said pressure regulator valve.

15. In a transmission control system for an engine driven vehicle, a fluid pressure actuated servo member, a fluid pressure source, means including a manually operable drive range selector valve adapted to select different drive ranges of transmission operation, a pressure regulator valve fan controlling the pressure level of fluid pressure delivered to said servo, a vehicle speed responsive governor adapted to deliver a variable fluid pressure, a chamber associated with said pressure regulator valve adapted to receive fluid pressure from said governor to modify the pressure level of fluid pressure delivered to said servo, and an additional valve controlled by said manually operable valve for controlling the admission of governor pressure to said chamber, said additional valve being effective in one position of said manually controlled valve to admit governor pressure to said chamber and effective in a second position of said manually controlled valve to connect said chamber to exhaust.

16. In a control system for a transmission having a fluid pressure actuated servo member, a fluid pressure source, means including a fluid pressure controlled shift valve for controlling the admission of fluid pressure to said servo, means including a manually operable valve assembly for controlling said shift valve, said valve assembly including a sleeve member, a stem extending through said sleeve for controlling a pressure metering valve adapted to deliver a variable fluid pressure to said shift valve, a passage connecting said sleeve to said shift valve, means yieldably biasing said sleeve to connect said passage to exhaust, and a cam member movable through a first range of motion for moving said stem and pressure metering valve to vary the pressure level of fluid pressure delivered to said shift valve, said cam being movable through a second range of motion to position said sleeve to connect said passage to fluid pressure delivered by said pressure metering valve.

17. In a control system for a vehicle transmission having a fluid pressure actuated servo member, a fluid pressure source, means including a fluid pressure controlled shift valve for controlling the admission of fluid pressure to said servo, means including a vehicle accelerator pedal controlled valve assembly for controlling said shift valve, said valve assembly including a sleeve member, a pressure metering valve adapted to deliver a variable fluid pressure to said shift valve, a stem extending through said sleeve operable upon said pressure metering valve, a passage connecting said sleeve to said shift valve, means yieldably biasing said sleeve to connect said passage to exhaust, and a vehicle accelerator pedal controlled cam contacting said stem, said cam being initially effective to actuate stem and said pressure metering valve to deliver a variable fluid pressure to said shift valve and being thereafter effective to move said sleeve to connect said passage to fluid pressure delivered by said pressure metering valve.

18. In a control system for a vehicle transmission having an engine throttle controlled by an accelerator pedal, a fluid pressure source, a servo member adapted to be controlled by fluid pressure, a valve assembly for controlling said shift valve, said valve assembly including a sleeve member, a fluid pressure metering valve adapted to deliver a variable fluid pressure to said shift valve and a stem member extending through said sleeve, a passage connecting said sleeve to said shift valve, a spring yieldably biasing said sleeve to connect said passage to exhaust, a spring intermediate said stem and said pressure metering valve, and an accelerator pedal controlled cam contacting one end of said stem, said cam being initially effective to move said stem and pressure metering valve to deliver a variable pressure to said shift valve, said pressure being increased from minimum to maximum as said accelerator pedal is moved from a throttle closing to a throttle opening position, said cam being thereafter effective to move said sleeve to connect said shift valve to fluid pressure delivered by said pressure metering valve upon further movement of said accelerator pedal toward its throttle opening position.

19. In a control system for a vehicle transmission having a fluid pressure actuated servo member, a fluid pressure source, a pressure regulator valve for controlling the pressure level of fluid pressure supplied to said servo, a vehicle speed responsive governor adapted to deliver a variable fluid pressure which increases with increase of vehicle speed, means including a shift valve for controlling the admission of fluid pressure to and exhaust of pressure from said servo, an exhaust passage from said shift valve, a first timing valve controlled by pressure delivered by said pressure regulator valve for varying the rate of fluid pressure discharge from said servo, said timing valve being spring biased to permit maximum fluid flow therethrough and being responsive to line pressure delivered by said pressure regulator valve to increasingly restrict flow of exhaust fluid as the pressure level of said line pressure increases, and a second timing valve for controlling the rate of exhaust of fluid pressure from said servo, said second timing valve being spring biased to restrict fluid flow therethrough, said second timing valve being controlled by fluid pressure delivered by said governor and to increase the rate of exhaust of fluid pressure from said servo as the vehicle speed increases.

20. In a transmission control system having a pair of fluid pressure responsive servo motors operable to establish different drive ratios, a passage connecting said servo motors in series, a fluid pressure source, valve means effective to direct fluid pressure to said servo motors to select the transmission drive ratio, and valve means in said passage responsive to fluid pressure discharge from said one servo, said valve being responsive to a predetermined pressure discharge from said one servo to permit unrestricted pressure discharge through said passage, said valve being effective upon a drop in pressure discharged from one servo to restrict the rate of discharge of pressure fluid through said passage.

21. In a transmission control system for an engine driven vehicle, a fluid pressure responsive servo member, a fluid pressure source, a fluid pressure actuated servo member, a hydraulically controlled shift valve for selectively connecting said servo member to said fluid pressure source or to exhaust, a pressure regulator valve for controlling the pressure value of fluid pressure supplied to said servo through said shift valve, vacuum responsive means operative upon said pressure regulator valve for varying the pressure supplied to said servo, a hydraulic governor hydraulically connected to said fluid pressure source and to said pressure regulator valve, said governor being adapted to deliver a variable pressure varying with variations in vehicle speed to said pressure regulator valve and to said hydraulically controlled shift valve to vary the pressure value of fluid pressure supplied to said servo through said shift valve.

22. In a transmission control system for an engine driven vehicle, a fluid pressure actuated servo member, a fluid pressure source, a hydraulically controlled shift valve for selectively connecting said servo member to said fluid pressure source or to exhaust, a pressure regulator valve for controlling the pressure value of fluid pressure supplied to said servo, vacuum responsive means operatively connected to said pressure regulator valve for varying the pressure value of fluid pressure supplied to said servo, a hydraulic speed responsive governor hydraulically connected to said shift valve and said pressure regulator valve, said governor being arranged to deliver a variable pressure to both said shift valve and pressure regulator valve to control the position of said shift valve and to control the pressure supplied to said servo through said shift valve.

23. In a transmission control system for an engine driven vehicle, a fluid pressure actuated servo member, a fluid pressure source, a shift valve for selectively connecting said servo member to said fluid pressure source or to exhaust, a pressure regulator valve for controlling the pressure value of fluid pressure supplied to said servo, vacuum responsive means associated with said pressure regulator valve for varying the pressure value of fluid pressure delivered by said valve, means connecting said vacuum responsive means to the intake manifold of said engine, a vehicle speed responsive governor adapted to deliver a variable pressure which increases with increase of vehicle speed, a hydraulic connection between said governor and pressure regulator valve, and a hydraulic connection between said governor and said shift valve, said governor being effective to vary the pressure value of fluid pressure delivered by said pressure regulator valve and to vary the position of said shift valve in accordance with changes in vehicle speed.

24. In a transmission control system for an engine driven vehicle, a fluid pressure actuated servo, a fluid pressure source, a shift valve for selectively connecting said servo to said fluid pressure servo or to exhaust, a pressure regulator valve for controlling the pressure value of fluid pressure supplied to said servo, vacuum responsive means operatively associated with said pressure regulator valve, a connection between said vacuum responsive means and the engine intake manifold, said vacuum responsive means being effective to position said pressure regulator valve to increase the pressure value of fluid pressure delivered by said pressure regulator valve as engine manifold vacuum decreases, a vehicle speed responsive governor hydraulically connected to said fluid pressure source adapted to deliver a variable pressure which increases with increase of vehicle speed, a hydraulic connection between said governor and said pressure regulator valve, said governor being effective to decrease the pressure value of fluid pressure delivered by said pressure regulator valve as vehicle speed increases, and a hydraulic connection between said governor and said shift valve, said governor being effective to control the position of said shift valve to connect said servo to said fluid pressure source upon a predetermined increase in vehicle speed.

25. In a transmission for an engine driven vehicle having a throttle controlled by an accelerator movable from the closed towards the open position in a first range of motion and being thereafter movable in a second range of motion, an input shaft, an output shaft, means including a first friction device for establishing a slow drive between said shafts, means including a second friction device for establishing a fast drive between said shafts, a first fluid pressure operated servo controlling said first friction device, a second fluid pressure operated servo controlling said second friction device, a throttle valve operative to supply fluid at a pressure varying in accordance with the amount of movement of said accelerator in said first range of movement, a governor operative to supply fluid at a pressure varying in accordance with the rate of rotation of said output shaft, a shift valve controlling said first and second servos and having a valve element movable between a downshift and an upshift position, said shift valve being effective in the downshift position to cause engagement of said first friction device and being effective in said upshift position to cause engagement of said second friction device, biasing means yieldingly urging said shift valve to the downshift position, means responsive to the pressure of the fluid supplied by said governor and urging said shift valve to the upshift position, a control chamber, means effective when said shift valve is in its downshift position to connect said control chamber to said throttle valve and effective when said shift valve is in its upshift position to connect said control chamber to a control passage, means effective when said accelerator is in its first range of motion to connect said control passage to exhaust, means effective when said accelerator is in its second range of motion to connect said control passage to a source of fluid under pressure, and means subject to the pressure of the fluid in said control chamber and urging said shift valve to its downshift position.

26. In a transmission for an engine driven vehicle having a throttle controlled by an accelerator movable from the closed towards the open position in a first range of motion and being thereafter movable in a second range of motion, an input shaft, an output shaft, means including a first friction device for establishing a slow drive between said shafts, means including a second friction device for establishing a fast drive between said shafts, a first fluid pressure operated servo controlling said first friction device, a second fluid pressure operated servo controlling said second friction device, a throttle valve operative to supply fluid at a pressure varying in accordance with the amount of movement of said accelerator in said first range of movement, a governor operative to supply fluid at a pressure varying in accordance with the rate of rotation of said output shaft, a shift valve controlling said first and second servos and having a valve element movable between a downshift and an upshift position, said shift valve being effective in the downshift position to cause engagement of said first friction device and being effective in said upshift position to cause engagement of said second friction device, biasing means yieldingly urging said shift valve to the downshift position, means responsive to the pressure of the fluid supplied by said governor and urging said shift valve to the upshift position, a control chamber, means effective when said shift valve is in its downshift position to connect said control chamber to said throttle valve and effective when said shift valve is in its upshift position to connect said control chamber to a control passage, means effective when said accelerator is in its first range of motion to connect said control passage to exhaust, means effective when said accelerator is in its second range of motion to supply fluid from said throttle valve to said control passage, and means subject to the pressure of the fluid in said control chamber and urging said shift valve to its downshift position.

27. In a transmission for an engine driven vehicle having a throttle controlled by an accelerator movable from the closed towards the open position in a first range of motion and being thereafter movable in a second range of motion, an input shaft, an output shaft, means including a first friction device for establishing a slow drive between said shafts, means including a second friction device for establishing a fast drive between said shafts, a first fluid pressure operated servo controlling said first friction device, a second fluid pressure operated servo controlling said second friction device, a throttle valve having a first element movable in accordance with movement of said accelerator and having a second element biased to a first position and movable therefrom to a second position only in response to movement of said accelerator in its second range of motion, said throttle valve including means governed by said first element and operative to supply fluid at a pressure varying in accordance with the amount of movement of said accelerator, a shift valve controlling said first and second servos and having a valve element movable between a downshift and an upshift position, said shift valve being effective in the downshift position to cause engagement of said first friction device and being effective in the upshift position to cause engagement of said second friction device, biasing means yieldingly urging said shift valve to the downshift position, a governor operative to supply fluid at a pressure varying in accordance with the rate of rotation of said output shaft, means responsive to the pressure of the fluid supplied by said governor and urging said shift valve to the upshift position, a control chamber, means effective when said shift valve is in its downshift position to connect said control chamber to said throttle valve and effective when said shift valve is in its upshift position to connect said control chamber to a control passage, said second element being effective in its first position to connect said control passage to exhaust and being effective in its second position to connect said control passage to a source of fluid under pressure, and means responsive to the pressure of the fluid in said control chamber and urging said shift valve to its downshift position.

28. In a transmission for an engine driven vehicle having a throttle controlled by an accelerator movable from the closed towards the open position in a first range of motion and being thereafter movable in a second range of motion, an input shaft, an output shaft, means including a first friction device for establishing a slow drive between said shafts, means including a second friction device for establishing a fast drive between said shafts, a first fluid pressure operated servo controlling said first friction device, a second fluid pressure operated servo controlling said second friction device, a throttle valve having a first element movable in accordance with movement of said accelerator and having a second element biased to a first position and movable therefrom to a second position only in response to movement of said accelerator in its second range of motion, said throttle valve including means governed by said first element and operative to supply fluid at a pressure varying in accordance with the amount of movement of said accelerator, a shift valve controlling said first and second servos and having a valve element movable between a downshift and an upshift position, said shift valve being effective in the downshift position to cause engagement of said first friction device and being effective in the upshift position to cause engagement of said second friction device, biasing means yieldingly urging said shift valve to the downshift position, a governor operative to supply fluid at a pressure varying in accordance with the rate of rotation of said output shaft, means responsive to the pressure of the fluid supplied by said governor and urging said shift valve to the upshift position, a control chamber, means effective when said shift valve is in its downshift position to connect said control chamber to said throttle valve and effective when said shift valve is in its upshift position to connect said control chamber to a control passage, said second element being effective in its first position to connect said control passage to exhaust and being effective in its second position to connect said control passage to said throttle valve, and means responsive to the pressure of the fluid in said control chamber and urging said shift valve to its downshift position.

29. In a transmission for an engine driven vehicle having a throttle controlled by an accelerator movable from the closed towards the open position in a first range of motion and being thereafter movable in a second range of motion, an input shaft, an output shaft, means including a first friction device for establishing a slow drive between said shafts, means including a second friction device for establishing a fast drive between said shafts, a first fluid pressure operated servo controlling said first friction device, a second fluid pressure operated servo controlling said second friction device, a throttle valve comprising a plunger movable in accordance with movement of said accelerator, a sleeve slidable on said plunger and biased to a first position, said sleeve being moved to a second position only in response to movement of said accelerator in its second range of motion, said throttle valve including means governed by said plunger and operative to supply fluid at a pressure varying in accordance with the amount of movement of said accelerator, a shift valve controlling said first and second servos and having a valve element movable between a downshift and an upshift position, said shift valve being effective in the downshift position to cause engagement of said first friction device and being effective in the upshift position to cause engagement of said second friction device, biasing means yieldingly urging said shift valve element to the downshift position, a governor operative to supply fluid at a pressure varying in accordance with the rate of rotation of said output shaft, means responsive to the pressure of the fluid supplied by said governor and urging said shift valve element to the upshift position, a control chamber, means effective when said shift valve element is in its downshift position to connect said control chamber to said throttle valve and effective when said shift valve is in its upshift position to connect said control chamber to a control passage, said sleeve being effective in said first position to connect said control passage to exhaust and being effective in said second position to connect said control passage to a source of fluid under pressure, and means subject to the pressure of fluid in said control chamber and urging said shift valve element to the downshift position.

30. In a transmission for an engine driven vehicle having a throttle controlled by an accelerator movable from the closed towards the open position in a first range of motion and being thereafter movable in a second range of motion, an input shaft, an output shaft, means including a first friction device for establishing a slow drive between said shafts, means including a second friction device for establishing a fast drive between said shafts, a first fluid pressure operated servo controlling said first friction device, a second fluid pressure operated servo controlling said second friction device, a throttle valve comprising a plunger movable in accordance with movement of said accelerator, a sleeve slidable on said plunger and biased to a first position, said sleeve being moved to a second position only in response to movement of said accelerator in its second range of motion, said throttle valve including means governed by said plunger and operative to supply fluid at a pressure varying in accordance with the amount of movement of said accelerator, a shift valve controlling said first and second servos and having a valve element movable between a downshift and an upshift position, said shift valve being effective in the downshift position to cause engagement of said first friction device and being effective in the upshift position to cause engagement of said second friction device, biasing means yieldingly urging said shift valve element to the downshift position, a governor operative to supply fluid at a pressure varying in accordance with the rate of rotation of said output shaft, means responsive to the pressure of the fluid supplied by said governor and urging said shift valve element to the upshift position, a control chamber, means effective when said shift valve element is in its downshift position to connect said control chamber to said throttle valve and effective when said shift valve is in its upshift position to connect said control chamber to a control passage, said sleeve being effective in said first position to connect said control passage to exhaust and being effective in said second position to connect said control passage to said throttle valve, and means subject to the pressure of the fluid in said control chamber and urging said shift valve element to the downshift position.

31. In a transmission for a vehicle having an engine, an input shaft, an output shaft, means including a first friction device for establishing a slow drive between said shafts, means including a second friction device for establishing a fast drive between said shafts, a first fluid pressure operated servo controlling engagement of said friction device, a second fluid pressure operated servo effective on the supply of fluid under pressure to cause engagement of said second friction device, a pump, a regulator valve controlling the pressure of the fluid supplied by said pump, said regulator valve having a valve element biased to the closed position in which release of fluid from said pump is cut off and being movable to an open position in which fluid is released from said pump, means responsive to the pressure of the fluid supplied by said pump and urging said valve element to the open position, means governed in accordance with the torque demand on the vehicle engine and urging said valve element to the closed position, a shift valve movable between a downshift and an upshift position and controlling said servos, said shift valve being effective in said downshift position to control said first servo to cause engagement of said first friction device and to connect said second servo to an exhaust passage, said shift valve being effective in said upshift position to control said first servo to cause release of said first friction device and to connect said second servo to said pump, and a metering valve controlling flow of fluid through said exhaust passage, said metering valve comprising a valve element biased to the open position and movable therefrom to a closed position, and means responsive to the pressure of the fluid supplied by said pump and urging said metering valve element to the closed position.

32. In a transmssion for a vehicle having an engine, an input shaft, an output shaft, means including a first friction device for establishing a slow drive between said shafts, means including a second friction device for establishing a fast drive between said shafts, a first fluid pressure operated servo controlling engagement of said friction device, a second fluid pressure operated servo effective on the supply of fluid under pressure to cause engagement of said second friction device, a pump, a regulator valve controlling the pressure of the fluid supplied by said pump, said regulator valve having a valve element biased to the closed position in which release of fluid from said pump is cut off and being movable to an open position in which fluid is released from said pump, means responsive to the pressure of the fluid supplied by said pump and urging said valve element to the open position, means governed in accordance with the torque demand on the vehicle engine and urging said valve element to the closed position, a shift valve movable between a downshift and an upshift position and controlling said servos, said shift valve being effective in said downshift position to control said first servo to cause engagement of said first friction device and to connect said second servo to an exhaust passage, said shift valve being effective in said upshift position to control said first servo to cause release of said first friction device and to connect said second servo to said pump, and a metering valve controlling flow of fluid through said exhaust passage, said metering valve comprising a valve element biased to the open position and movable therefrom to a closed position, and means responsive to the pressure of the fluid supplied by said pump and urging said metering valve element to the closed position, and a second metering valve also controlling flow of fluid through said exhaust passage, said second metering valve comprising a second valve element biased to a first position in which flow through said exhaust passage is restricted and movable to a second position in which fluid may flow through said exhaust passage at a rapid rate, and means governed in accordance with the rate of rotation of said output shaft and urging said second valve element from its first to its second position.

33. In a vehicle transmission, in combination, a first friction device effective when engaged to establish a fast ratio drive through said transmission, a second friction device effective when engaged to establish a slow ratio drive through said transmission, a source of fluid under pressure, a first servo having a first application chamber, said servo being effective on the supply of fluid under pressure to said first application chamber to engage said first friction device, a second servo having a movable abutment having on one face a second application chamber and having at the opposite face a release chamber, said abutment being effective to engage said second friction device when said second application chamber is connected to said source of fluid under pressure and said release chamber is connected to exhaust and being effective to release said second friction device when said release chamber is connected to said source of fluid under pressure, means for connecting said second application chamber to said source of fluid under pressure, a timing valve, a control passage connected with said first application chamber independent of said timing valve and connected to said release chamber through said timing valve, and valve means for at times connecting said control passage to said source of fluid under pressure and at other times to exhaust, said timing valve being effective when said control passage is connected to exhaust to permit rapid initial flow of fluid from said release chamber and to restrict final flow of fluid from said release chamber.

34. In a vehicle transmission, in combination, a first friction device effective when engaged to establish a fast ratio drive through said transmission, a second friction device effective when engaged to establish a slow ratio drive through said transmission, a source of fluid under pressure, a first servo having a first application chamber, said servo being effective on the supply of fluid under pressure to said first application chamber to engage said first friction device, a second servo having a movable abutment having on one face a second application chamber and having at its other face a release chamber, said second servo being effective to engage said second friction device when said second application chamber is supplied with fluid under pressure and said release chamber is connected to exhaust and being effective to release said second friction device when said release chamber is connected to said source of fluid under pressure, means for connecting said second application chamber to said source of fluid under pressure, a timing valve, a passage for connecting said first application chamber to said release chamber through said timing valve and valve means for at times connecting said first application chamber to exhaust and at other times connecting said first application chamber to said source of fluid under pressure, said timing valve being effective to permit rapid initial flow of fluid from said release chamber to said first application chamber and to restrict final flow of fluid from said release chamber.

35. In a vehicle transmission, in combination a first friction device effective when engaged to establish a fast ratio drive through said transmission, a second friction device effective when engaged to establish a slow ratio drive through said transmission, a source of fluid under pressure, a first servo, having a first application chamber, said servo being effective on the supply of fluid under pressure to said first application chamber to engage said first friction device, a second servo having a movable abutment having on one face a second application chamber and having at the opposite face a release chamber, said abutment being effective to engage said second friction device when said second application chamber is connected to said source of fluid under pressure and said release chamber is connected to exhaust and being effective to release said second friction device when said release chamber is connected to said source of fluid under pressure, means for connecting said second application chamber to said source of fluid under pressure, a timing valve, a control passage connected with said first application chamber independent of said timing valve and connected to said release chamber through said timing valve, and valve means for at times connecting said control passage to said source of fluid under pressure and at other times to exhaust, said timing valve comprising a first check valve controlling a first passage through said timing valve and arranged to prevent flow through said first passage to said release chamber, a second check valve controlling a second passage through said timing valve and arranged to prevent flow through said second passage from said release chamber, and a third passage of limited flow capacity independent of said check valves and through which fluid may flow to and from said release chamber, said first check valve being effective to permit flow of fluid from said release chamber when and only when the pressure of the fluid on the side of said check valve adjacent said release chamber exceeds by a substantial amount the pressure of the fluid on the opposite side of said check valve.

36. In a vehicle transmission, in combination a first friction device effective when engaged to establish a fast ratio drive through said transmission, a second friction device effective when engaged to establish a slow ratio drive through said transmission, a source of fluid under pressure, a first servo having a first application chamber, said servo being effective on the supply of fluid under pressure to said first application chamber to engage said first friction device, a second servo having a movable abutment having on one face a second application chamber and having at its other face a release chamber, said second servo being effective to engage said second friction device when said second application chamber is supplied with fluid under pressure and said release chamber is connected to exhaust and being effective to release said second friction device when said release chamber is connected to said source of fluid under pressure, means for connecting said second application chamber to said source of fluid under pressure, a timing valve, a passage for connecting said first application chamber to said release chamber through said timing valve, and valve means for at times connecting said first application chamber to exhaust and at other times connecting said first application chamber to said source of fluid under pressure, said timing valve comprising a first check valve controlling a first passage through said timing valve and arranged to prevent flow through said first passage to said release chamber, a second check valve controlling a second passage through said timing valve and arranged to prevent flow through said second passage from said release chamber, and a third passage of limited flow capacity independent of said check valves and through which fluid may flow to and from said release chamber, said first check valve being effective to permit flow of fluid from said release chamber when and only when the pressure of the fluid on the side of said check valve adjacent said release chamber exceeds by a substantial amount the pressure of the fluid on the opposite side of said check valve.

37. In a vehicle transmission, in combination, a first friction device effective when engaged to establish a fast ratio drive through said transmission, a second friction device effective when engaged to establish a slow ratio drive through said transmission, a source of fluid under pressure, a first servo having a first application chamber, said servo being effective on the supply of fluid under pressure to said first application chamber to engage said first friction device, a second servo having a movable abutment having on one face a second application chamber and having at the opposite face a release chamber, said abutment being effective to engage said second friction device when said second application chamber is connected to said said source of fluid under pressure and said release chamber is connected to exhaust and being effective to release said second friction device when said release chamber is connected to said source of fluid under pressure, means for connecting said second application chamber to said source of fluid under pressure, a timing valve, a control passage connected with said first application chamber independent of said timing valve and connected to said release chamber through said timing valve, and valve means for at times connecting said control passage to said source of fluid under pressure and at other times to exhaust, said timing valve comprising a valve element yieldingly urged to the closed position and controlling a release passage through which fluid may be released from said release chamber, said valve element being subject to the opposing force of the fluid under pressure in the portion of said control passage between said timing valve and said release chamber and of the portion of said control passage on the side of said timing valve remote from said release chamber, said valve element being moved to the open position when and only when the pressure of the fluid in the portion of said control passage between said timing valve and the release chamber exceeds by a substantial amount the pressure of the fluid in the portion of said control passage on the side of said timing valve remote from said release chamber, a supply passage of large flow capacity controlled by a check valve arranged to permit flow of fluid to said release chamber and to prevent flow from said release chamber, said supply passage being independent of said valve element, and another passage independent of said valve element and of said check valve and through which fluid may flow to or from said release chamber, said last named passage having limited flow capacity.

38. In a vehicle transmission, in combination, a first friction device effective when engaged to establish a fast ratio drive through said transmission, a second friction device effective when engaged to establish a slow ratio drive through said transmission, a source of fluid under pressure, a first servo having a first application chamber, said servo being effective on the supply of fluid under pressure to said first application chamber to engage said first friction device, a second servo having a movable abutment having on one face a second application chamber and having at its other face a release chamber, said second servo being effective to engage said second friction device when said second application chamber is supplied with fluid under pressure and said release chamber is connected to exhaust and being effective to release said second friction device when said release chamber is connected to said source of fluid under pressure, means for connecting said second application chamber to said source of fluid under pressure, a timing valve, a passage for connecting said first application chamber to said release chamber through said timing valve and valve means for at times connecting said first application chamber to exhaust and at other times connecting said first application chamber to said source of fluid under pressure, said timing valve comprising a valve element yieldingly urged to the closed position and controlling a release passage through which fluid may be released from said release chamber, said valve element being subject to the opposing forces of the fluid under pressure in the portion of said control passage between said timing valve and said release chamber and of the portion of said control passage on the side of said timing valve remote from said release chamber, said valve elements being moved to the open position when and only when the pressure of the fluid in the portion of said control passage between said timing valve and the release chamber exceeds by a substantial amount the pressure of the fluid in the portion of said control passage on the side of said timing valve remote from said release chamber, a supply passage of large flow capacity controlled by a check valve arranged to permit flow of fluid to said release chamber and to prevent flow from said release chamber, said supply passage being independent of said valve element, and another passage independent of said valve element and of said check valve and through which fluid may flow to or from said release chamber, said last-named passage having limited flow capacity.

References Cited in the file of this patent

UNITED STATES PATENTS

| 2,203,296 | Fleischel | June 4, 1940 |
| 2,212,740 | Iavelli | Aug. 27, 1940 |
| 2,282,949 | Dolza | May 12, 1942 |
| 2,409,975 | Curtis | Oct. 22, 1946 |
| 2,465,334 | Wheaton | Mar. 22, 1949 |
| 2,485,126 | Wood | Oct. 18, 1949 |
| 2,528,585 | Farkas | Nov. 7, 1950 |

(Other references on following page)

UNITED STATES PATENTS

| | | |
|---|---|---|
| 2,550,373 | Ortloff et al. | Apr. 24, 1951 |
| 2,555,702 | Railton | June 5, 1951 |
| 2,575,522 | McFarland | Nov. 10, 1951 |
| 2,584,965 | McFarland | Feb. 5, 1952 |
| 2,603,235 | Kirkham | July 15, 1952 |
| 2,693,711 | Kelbel et al. | Nov. 9, 1954 |
| 2,697,363 | Sheppard | Dec. 21, 1954 |

FOREIGN PATENTS

| | | |
|---|---|---|
| 663,704 | Great Britain | Dec. 27, 1951 |
| 924,557 | France | Mar. 10, 1947 |